Patented Oct. 10, 1939

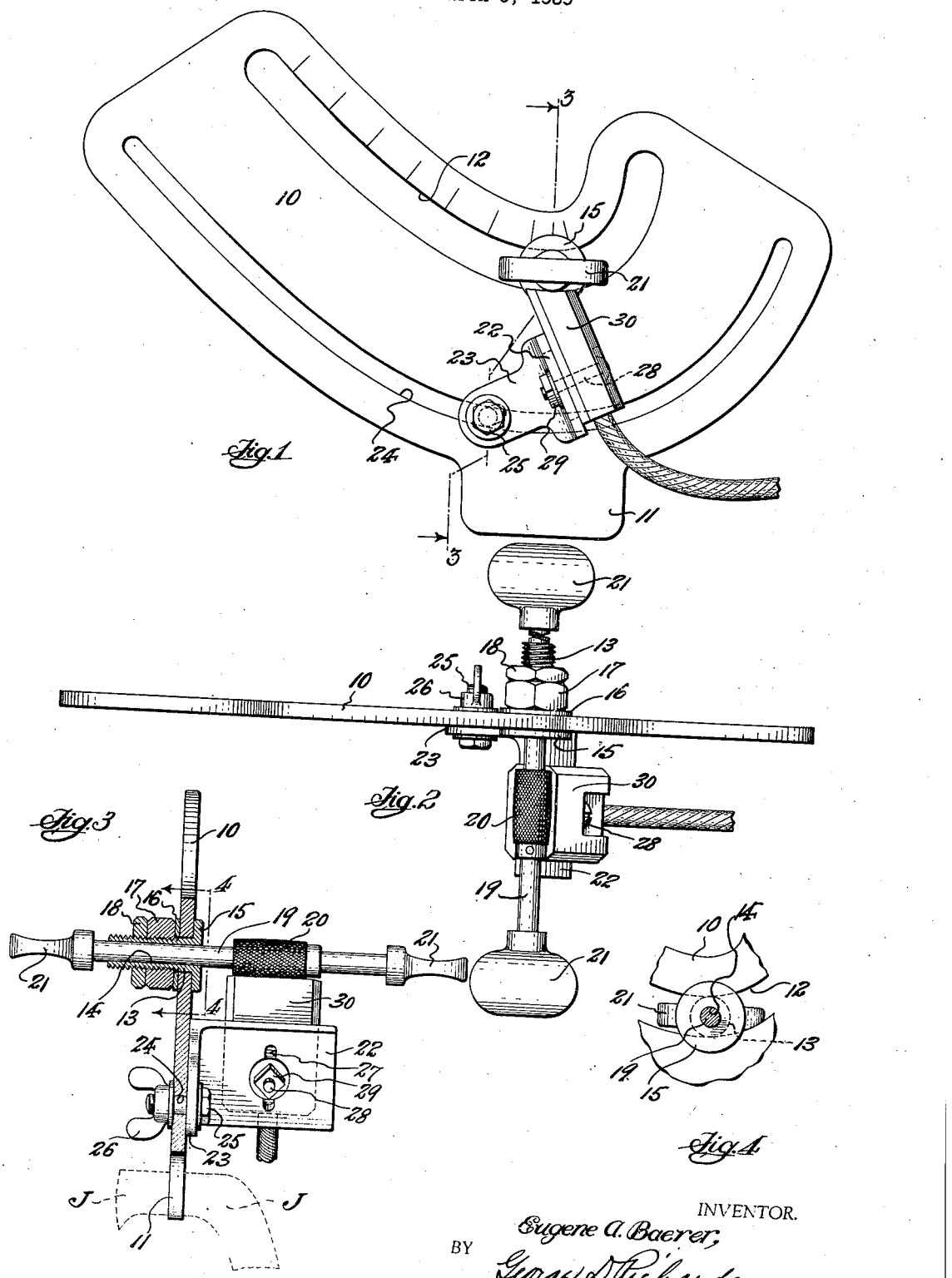

2,175,241

UNITED STATES PATENT OFFICE 2,175,241

MEANS FOR DRESSING COMMUTATOR BRUSH ENDS

Eugene A. Baerer, Ridgefield, N. J.

Application March 9, 1939, Serial No. 260,783

8 Claims. (Cl. 90—12)

This invention relates to an improved apparatus for dressing the contact end faces of commutator brushes of electric generators, motors and the like; and the invention has reference, more particularly, to a novel and convenient tool for shaping the ends of commutator brushes to substantially conform the same to the circumferential curvature of commutators upon which the same are to run.

This invention has for an object to provide an apparatus for the purposes stated, wherein means is provided for mounting and guiding a reciprocable cutting tool so as to confine its movements in a selected curved field or plane of operation conforming substantially to the circumferential curvature of the particular commutator to which the brush to be dressed by the tool is desired to be fitted. To this end the novel apparatus comprises a jig plate having a tool bearing guide slot of irregularly curved extent, i. e. of a curvature increasing in radius along its extent from a point of selected minimum radius to a point of maximum radius, a cutting tool device supported for reciprocable movement by said bearing, and a work support; said jig plate having an irregularly curved adjustment slot to facilitate positioning of the work support and brush carried thereby in operative relation to any selected portion of the tool bearing guide slot best calculated to conform to the circumferential curvature of the particular commutator to which the dressed brush end is desired to be fitted.

Other objects of this invention, not at this time more particularly enumerated, will be understood from the following detailed description of the same.

An illustrative embodiment of this invention is shown in the accompanying drawing, in which:

Fig. 1 is a side elevation of the novel apparatus for dressing commutator brushes; Fig. 2 is a top elevational view of the same; Fig. 3 is a transverse vertical sectional view thereof, taken on line 3—3 in Fig. 1; and Fig. 4 is a fragmentary sectional view, taken on line 4—4 in Fig. 3.

Similar characters of reference are employed in the hereinabove described views to indicate corresponding parts.

Referring to the drawing, the reference character 10 indicates a jig plate of any suitable peripheral shape and of suitable thickness, but preferably provided at a suitable point of its lower marginal portion with a downwardly projecting base tongue 11. Said jig plate 10 is provided in its upper portion with a tool bearing guide slot 12. This guide slot is of irregularly curved extent whereby its curvature increases in radius from a point of selected minimum radius at one end to a point of maximum radius at its opposite end. The curvature of said guide slot is thus in the nature of a French or logarithmic curve progressively increasing in radius from one end toward the other end, so that various sections of its extent will respectively more or less conform to the circumferential curvature of commutators of various diameters, for service with which it is desired to conformingly dress the ends of brushes to be operatively fitted thereto.

The tool bearing means of the apparatus, in one illustrative embodiment thereof, comprises a bearing member 13 having an axial bore 14 to serve as a slideway for a reciprocable cutting tool means. Said bearing member 13 is disposed to extend transversely through the guide slot 12, and is provided at one end with a keeper flange 15 to straddle said guide slot 12 so as to slidingly abut one face of said jig plate 10 at points bordering the margins of said guide slot. Arranged over the opposite end portion of said bearing member 13 is keeper washer 16 which likewise straddles said guide slot 12 so as to slidingly abut the opposite face of said jig plate 10 at points bordering the margins of said guide slot. Said opposite end portion of said bearing member 13 is externally screw-threaded to receive a keeper nut 17 operative to retain said keeper washer 16 in place. If desired, a jam or lock nut 18 may also be screwed upon said threaded end portion of the bearing member 13 to secure the keeper nut 17 against accidental displacement.

The cutting tool of the apparatus comprises a slide bar 19 mounted to slidably extend through bore 14 of said bearing member 13. Suitably affixed to said slide bar 19 is a cutting tool 20. This cutting tool comprises a cylindrical body the surface of which is provided with suitably formed file teeth. Preferably said cutting tool is of longitudinally convex formation or barrel-shaped. Affixed to the respective extremities of said slide bar 19 are suitably shaped finger pieces 21 by which the tool may be grasped and manipulated in use.

Arranged to be adjustably mounted on the jig-plate 10 is a work supporting bracket comprising a work carrier table 22 having a bracket arm 23 to abut a face of said jig-plate. Formed in said jig-plate 10 below and approximately conformingly parallel to said guide slot 12 is an irregularly curved adjustment slot 24. Associated with said bracket arm 23 is a coupling bolt 25 arranged to extend through said adjustment slot 24, and applied on the free end portion of said bolt 25 is a thumb nut 26. The carrier table 22 is preferably provided with a slot 27 through which may extend a bolt 28 which, with its nut 29, may be utilized to secure a commutator brush 30 to be treated in affixed relation to the carrier table, so as to be supported thereby subject to desired dressing of its commutator contacting end.

In use, the jig-plate 10 is mounted in a fixed position at a work bench. Preferably this is done by inserting its base tongue 11 between the jaws J of a bench vise (as indicated in Fig. 3), and then closing the vise to supportingly grip and retain the jig-plate in an upstanding fixed position.

The brush 30, desired to be dressed, is placed upon the carrier table 22 and affixed thereto by the bolt 28 and nut 29, whereafter the carrier table is moved along the jig-plate 10 to a selected position opposed to that portion of the guide slot 12 the curvature of which corresponds substantially to the circumferential curvature of the commutator with respect to which the brush to be dressed is desired to be correspondingly shaped and fitted. A template corresponding to the commutator curvature may be employed, if desired, for the purpose of ascertaining or locating that portion of the guide slot 12 which most nearly conforms to the commutator curvature, and to which portion the brush end is to be opposed. A proper location for the carrier table having been determined, and said carrier plate having been shifted along the adjustment slot 24 to such location, the carrier table is thereupon angularly adjusted to dispose the brush 30 at an inclination corresponding to that of its position when operatively assembled relative to the commutator it is to serve, whereupon the carrier table is secured against displacement from its thus selected adjusted position on the jig-plate 10 by screwing home the thumb nut 26 to tighten the coupling bolt 25 so as to bind the carrier table against displacement during the brush dressing operation.

When the brush 30 is thus mounted subject to dressing by the cutting tool means, the dressing operations are carried on as follows:—

The slide bar 19 is grasped by means of the finger-pieces 21 at its opposite ends and is thereupon reciprocated back and forth through the bearing member 13, thus reciprocating the file-like cutting tool 20 in like manner. At the same time the cutting tool 20 is urged toward the end of the brush 30, so that the cutting tool may engage and cut away the material of the brush body. Owing to the curvature of the guide slot, the path of movement of the reciprocated cutting tool, as it is urged toward the brush while being reciprocated, will conform in curvature to the degree of curve desired to produce the concave surface at the brush end which will substantially correspond and conform to the circumferential surface of the commutator to which the brush is to be fitted. The cutting tool 20 is therefore advanced across the brush end in one direction while being reciprocated back and forth across the brush end in a direction at right angles to such advance, so that finally the brush end is cut away to form the corresponding or fitted curved contact surface which is to bear on the commutator when the brush is operatively assembled with the latter for use.

While I have shown, for the purposes of illustration a cutting tool adapted to be transversely reciprocated in the bearing member 13, it will be obvious that instead of reciprocation the tool may well be merely rotated, either by hand or power, or it may be manipulated with a combined reciprocatory and rotary movement. In any such case, however, the essential factor is that the tool will be guided in a curved plane, as it traverses the brush end, by the movement of the bearing member 13 through the selected curved section of the guide slot 12.

It will be obvious that the novel tool provides a very convenient and easily operated tool for thus dressing the contact ends of commutator brushes, and for any other work of a similar nature. It will also be apparent that owing to the described irregular shape of the tool guide slot 12, various arcuate portions are provided with at selected points along its extent adapted to correspond to the curvatures of commutators of various diametric sizes within a desired minimum-maximum range, as, for example, from two inch commutators upward to those of very large comparative diameter. If desired graduation marks may be etched on the face of the jig-plate adjacent to the guide slot 12 (as shown in Fig. 1, at various points which will correspond or point to areas in the extent of the guide slot which respectively correspond to the circumferential curvature of commutators of respectively different diametric sizes.

I am aware that various changes can be made and apparent more or less widely different embodiments of this invention could be made without departing from the scope thereof as defined in the following claims. It is therefore intended that all matter contained in the above description or shown in the accompanying drawing shall be interpreted as illustrative and not in a limiting sense.

I claim:

1. In apparatus of the kind described, a jig-plate having an irregularly curved tool bearing guide slot, a tool bearing means movable in said guide slot, a cutting tool means supported by said bearing means, a work support, and means to adjustably affix said work support to said jig-plate relative to any selected portion of the guide slot extent to thereby disclose the work subject to operative effects of the cutting tool means as guided by said selected portion of said guide slot.

2. In apparatus of the kind described, a jig-plate having an irregularly curved tool bearing guide slot, a tool bearing means movable in said guide slot, a cutting tool means supported by said bearing means, a work support including a table having a bracket arm slidably engageable with a face of said jig-plate, said jig-plate having a work support adjustment slot, and fastening means extending from said bracket arm through said adjustment slot whereby said work support may be secured in operative relation to any selected portion of said guide slot to thereby dispose the work subject to operative effects of the cutting tool means as guided by said selected portion of said guide slot.

3. In an apparatus of the kind described, a jig-plate having an irregularly curved tool bearing guide slot, a tool bearing means movable in said guide slot, said tool bearing means being disposed transverse to the plane of said jig-plate and having an axial bore extending therethrough, a slide bar reciprocable through the bore of said tool bearing means, a cutting tool carried by said slide bar, a work support, means to adjustably affix said work support to said jig-plate relative to any selected portion of the guide slot extent to thereby support the work subject to operative effects of the cutting tool means as guided by said selected portion of said guide slot.

4. In an apparatus of the kind described, a jig-plate having an irregularly curved tool bearing guide slot, a tool bearing means movable in said guide slot, said tool bearing means being disposed transverse to the plane of said jig-plate and having an axial bore extending therethrough, a slide bar reciprocable through the bore of said tool bearing means, a cutting tool carried by said slide bar, a work support including a table having a bracket arm slidably engageable with a face of said jig-plate, said jig-plate having a work support adjustment slot, and fastening means extending from said bracket arm through said adjustment slot whereby said work support may be secured in operative relation to any selected portion of said guide slot to thereby dispose the work subject to operative effects of the cutting tool means as guided by said selected portion of said guide slot.

5. In apparatus of the kind described, a jig-plate adapted to be supported in a suitably fixed position, said jig-plate having a tool bearing guide slot of irregularly curved extent the curvature of which is of increasing radius along its extent from a point of minimum radius to a point of maximum radius, a tool bearing means movable in said guide slot, a cutting tool means supported by said bearing means, a work support, and means to adjustably affix said work support to said jig-plate relative to any selected portion of the guide slot extent to thereby dispose the work subject to operative effects of the cutting tool means as guided by said selected portion of said guide slot.

6. In apparatus of the kind described, a jig-plate adapted to be supported in a suitably fixed position, said jig-plate having a tool bearing guide slot of irregularly curved extent the curvature of which is of increasing radius along its extent from a point of minimum radius to a point of maximum radius, a tool bearing means movable in said guide slot, a cutting tool means supported by said bearing means, a work support, said work support comprising a table to which the work may be affixed, a bracket arm extending from said table to slidably engage a face of said jig-plate, said jig-plate having a work support adjustment slot, and fastening means extending from said bracket arm through said adjustment slot whereby said work support may be secured in linearly and angularly adjusted relation to any selected portion of said guide slot to thereby dispose the work subject to operative effects of the cutting tool means as guided by said selected portion of said guide slot.

7. In apparatus of the kind described as defined in claim 5 wherein said tool bearing means is provided with an axial bore transverse to the plane of said jig-plate, and the cutting tool means comprises a slide bar reciprocable through the bore of said tool bearing means, and a file-like cutting tool affixed on said slide bar.

8. In apparatus of the kind described as defined in claim 6 wherein said tool bearing means is provided with an axial bore transverse to the plane of said jig-plate, and the cutting tool means comprises a slide bar reciprocable through the bore of said tool bearing means, and a file-like cutting tool affixed on said slide bar.

EUGENE A. BAERER.